United States Patent [19]
Cellier

[11] Patent Number: 6,126,116
[45] Date of Patent: *Oct. 3, 2000

[54] COORDINATABLE SYSTEM OF INCLINED ECCENTRIC GEOSYNCHRONOUS ORBITS

[75] Inventor: Alfred Cellier, Rancho Palos Verdes, Calif.

[73] Assignee: Hughes Electronics Corporation, El Segundo, Calif.

[*] Notice: This patent is subject to a terminal disclaimer.

[21] Appl. No.: 09/119,680

[22] Filed: Jul. 21, 1998

Related U.S. Application Data

[63] Continuation-in-part of application No. 08/876,278, Jun. 16, 1997, Pat. No. 6,019,318.

[51] Int. Cl.$^7$ .................................................. B64G 1/10
[52] U.S. Cl. ................................... 244/158 R; 455/12.1; 455/13.2
[58] Field of Search ................... 244/158 R; 455/12.1, 455/13.1, 13.2, 13.3; 342/356

[56] References Cited

U.S. PATENT DOCUMENTS

| | | |
|---|---|---|
| 3,497,807 | 2/1970 | Newton . |
| 4,809,935 | 3/1989 | Draim . |
| 5,551,624 | 9/1996 | Horstein et al. . |
| 5,619,211 | 4/1997 | Horkin et al. . |
| 5,641,134 | 6/1997 | Vatt . |
| 5,669,585 | 9/1997 | Castiel et al. . |
| 5,678,175 | 10/1997 | Stuart et al. . |
| 5,867,783 | 2/1999 | Horstein et al. . |
| 5,871,181 | 2/1999 | Mass . |
| 5,979,830 | 11/1999 | Kellermeier . |

OTHER PUBLICATIONS

Chiba, I., et al., "Inclined Geo Satellite Communication System With Deployable Phased Array Antennas" AIAA (1997) pp. 243–249.

"Effects of NGSO Provisional EPFD, APFP Limits on 'Quasi–Geostationary' Systems" ITU (Jun. 25, 1998).

*Primary Examiner*—Peter M. Poon
*Assistant Examiner*—Tien Dinh
*Attorney, Agent, or Firm*—Bradley K. Lortz; Vijayalakshmi D. Duraiswamy; Michael W. Sales

[57] ABSTRACT

A coordinatable system of geosynchronous ("24 hour"), inclined, and slightly elliptic satellite orbits, increases available satellite orbital capacity and enables spectrum re-use by forming "highways" of moving "slots" in the space in and about the geostationary orbit (GSO) belt worldwide. Each of a plurality of repeating ground tracks is shared by multiple satellite orbits (and thus "slots"), positioned to achieve specified minimum specified angular separation from other slots using the same frequencies. Ground tracks are located at specified longitudes of symmetry, and orbital parameters are chosen to realize certain which provide the near-maximum total number of slots and which fit neatly within, and replace, some of the existing grid of GSO slots. Incremental modularity permits gradual expansion from current GSO usage, while systematic extension results in large theoretical capacity expansion.

20 Claims, 7 Drawing Sheets

COORDINATABLE SYSTEM OF INCLINED ECCENTRIC GEOSYNCHRONOUS ORBITS

CROSS-REFERENCE TO RELATED APPLICATIONS

This application is a continuation-in-part of U.S. patent application Ser. No. 08/876,278, filed on Jun. 16, 1997, and entitled "Coordinatable System of Inclined Geosynchronous Satellite Orbits", the subject matter of such application being incorporated herein by reference, now U.S. Pat. No. 6,019,318.

TECHNICAL FIELD

The present invention relates generally to coordinatable systems of clustered geosynchronous satellite orbits and, more particularly, to such systems wherein the planes of the family of satellite orbits are inclined with respect to the Earth's equatorial plane, the orbits are slightly elliptic, and the satellites are respectively phased, in a systematically coordinated fashion which enables and promotes expanded frequency reuse.

BACKGROUND ART

Satellites in geostationary orbits (GSOs) have been widely preferred for several decades because of the economic advantages afforded by such orbits. In a geostationary orbit, a satellite traveling above the Earth's equator, in the same direction as that in which the Earth is rotating, and at the same angular velocity, appears stationary relative to a point on the Earth. These satellites are always "in view" at all locations within their service areas, so their utilization efficiency is effectively 100 percent. Antennas at Earth ground stations need be aimed at a GSO satellite only once; no tracking system is required.

Coordination between GSO's and with terrestrial services is facilitated by governmental allocation of designated "slots" angularly spaced according to service type. Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

This has encouraged the development of complex and expensive new systems including those using low Earth orbits (LEO's), medium Earth orbits (MEO's), and higher frequencies, for example, the Ka band (up to approximately 40 GHz). Growth to higher frequencies is limited by problems of technology and propagation, and expansion in satellite applications requires exploitation of the spatial dimension (i.e., above and below the GSO belt). A host of proposed LEO and MEO systems exemplify this direction.

The recently filed LEO and MEO system applications, however, introduce another problem. Frequency coordination and sharing are made difficult by the unstructured criss-crossing of the lines of sight of these systems. This has the potential of severely impeding effective spectrum use with nongeostationary orbits (NGSO) in general.

There has been no known prior effort to exploit coordinatable systems of inclined eccentric geosynchronous orbits (IEGOs) in a systematic manner, even though the unused domain of inclined eccentric geosynchronous orbits offers great potential for the coordinatable growth of satellite service.

In the parent application, U.S. Ser. No. 08/876,278, clusters of inclined eccentric geosynchronous orbits operate above and below the GSO belt. As the satellites in the parent application approach the alignment with the GSO belt, satellite operation must be discontinued because the line of sight with the GSO belt may overlap. As the satellites travel into the lower portion of their paths, contact with a ground station in the northern hemisphere is not possible. Thus, either service is discontinued or service is handed over to another satellite orbitally out of phase with the satellite out of contact.

While the various prior systems function relatively satisfactorily and efficiently, none discloses the advantages of the coordinatable system of inclined, eccentric geosynchronous satellite orbits in accordance with the present invention as is hereinafter more fully described.

SUMMARY OF THE INVENTION

It is an object of the present invention to provide a framework for growth of geosynchronous satellite services, accommodating multiple service operations. Another object of the present invention is to enable frequency re-use of spectrum used by regional (geosynchronous) satellites in an easily coordinated manner coordinated with that of the geostationary services.

Yet another object of the present invention is to avoid or delay the technical and financial challenges of moving to still higher frequencies for expansion. Still another object of the present invention is to provide predominately specific hemispheric or regional coverage rather than global coverage.

An additional object of the present invention is to provide a satellite system with continuous coverage of the service area with the same satellite, thus having greater utilization efficiency than systems using low Earth orbits (LEO's) and/or medium Earth orbits (MEO's).

In one aspect of the invention, a system of inclined eccentric geosynchronous satellite orbits is coordinatable with a geostationary belt of satellite positions that has a plurality of geostationary slots. The system includes a plurality of satellite positions representing the maximum number of satellites that may be included in the coordinatable system of inclined eccentric geosynchronous satellite orbits to achieve optimum satellite coverage continuously within a specified service area. Each satellite position is located in one of a plurality of satellite orbits forming one of a plurality of families of satellite orbits. Each of the plurality of satellite orbits within any one of the plurality of families of satellite orbits defining an orbital plane having a unique inclination with respect to the equatorial plane of the Earth and with respect to the orbital plane of any other one of the plurality of satellite orbits within the same family of satellite orbits.

The satellite orbits intersect the equitorial plane just inside the geostationary belt. Loci of subsatellite points are repeatedly traced upon the surface of the Earth by a straight line extending from the center of the Earth to an orbiting satellite position generating an imaginary ground track that is stationary on the surface of the Earth. The ground track traced by orbiting satellite positions within any one of the plurality of families of satellite orbits define an area therewithin that differs from the area defined within the ground track traced by orbiting satellite positions within any other family of satellite orbits. The ground tracks are mutually and generally symmetrically nested about a first longitude of symmetry to form a first set of ground tracks. The satellite positions within each of the plurality of families of satellite orbits are coordinated with each other and are further coordinated with the satellite positions to achieve a minimum specified angular separation between the ground tracks of said satellites occupying the plurality of satellite positions.

An advantage of the present invention is that it provides an expanded use of spectrum up through the C, Ku- and Ka-bands, using predominately off-the-shelf hardware. Another advantage is that the coordinatable system can provide continuous coverage without hand over to another satellite. Still another advantage is that the present invention avoids difficulties in frequency coordination and spectrum re-use difficulties, which are encountered with lower altitude (LEO and MEO) orbits.

A feature of the present invention is that it provides an orderly method for expanding the capacity of coordinatable orbit space both incrementally and by a large factor, in numbers significantly exceeding the current capacity of the geostationary (GSO) belt.

In realizing the aforementioned and other objects, advantages, and features of the present invention, a plurality of coordinated and synchronized sets of moving "slots", each of which is a potential satellite location, is established. The moving slots are coordinated with the GSO belt slots. The moving slots preferably displace some GSO belt slots.

The objects, advantages and features of the present invention are readily apparent from the following detailed description of the best mode for carrying out the invention when taken in connection with the accompanying drawings and appended claims.

BRIEF DESCRIPTION OF THE DRAWINGS

A more complete appreciation of the invention and many of the attendant advantages and features thereof may be readily obtained by reference to the following detailed description when considered with the accompanying drawings in which like reference characters indicate corresponding parts in all the views, wherein.

BEST MODE(S) FOR CARRYING OUT THE INVENTION

The present invention is illustrated herein in terms of a satellite orbit system using a portion of the geostationary orbit (GSO) belt. However, it is to be understood that the invention may also be used in a satellite system together with non-GSO belt satellites.

The essence of the invention is the establishment of multiple sets of satellite orbits whose repeating ground tracks on the earth are interspersed, interleaved, and/or otherwise coordinated with respect to the positions of satellites in a GSO belt.

In the present invention, the coordinatable system of geosynchronous (24 hour), inclined elliptic geosynchronous orbits (IEGO) satellites enables spectrum re-use by forming "highways" of moving "slots" coordinated with the GSO belt worldwide. Each of a plurality of repeating ground tracks is shared by multiple satellite orbits. The slots are positioned to achieve minimum specified angular separation from other slots using the same frequencies. The IEGO orbit rings add significant capacity for additional multiple users. Some additional expense in implementing such a system may result if slow tracking antenna systems are employed by the users.

Ground tracks are imaginary lines representing the loci of subsatellite points that are repeatedly traced on the surface of the Earth by lines extending from the center of the Earth to orbiting satellites. IEGO ground track rings are located at specified longitudes and retrace repeatedly. The longitude of symmetry is the line of longitude about which the IEGO ground track is symmetrically disposed. Preferably, the ground track encircles one or more GSO slots.

Orbital parameters are chosen to realize certain ground track shapes (the preferred equirectangular mode has equal inclination and equatorial half-width) which provide the near-maximum total number of slots and which fit neatly within, and replace, some of the existing grid of GSO slots. Consideration is given to specified constraints on separation angle, service area coverage, elevation angle, and time coverage.

The present invention allows for coverage of a specified region and for a systematic continuation of expansion over time until maximum capacity is reached. The systematic expansion provides predictable satellite positions and facilitates the coordination of all frequency bands with other communication stations, space, terrestrial and mobile, to provide a variety of services.

Multiple satellite systems, engaged in communications businesses, sensing, navigation, and the like, operate as constituent systems within the context of this highway structure with a minimum of coordination, as contrasted with the difficulties of frequency sharing experienced with low Earth orbit (LEO) and medium Earth orbit (MEO) systems, and are free from the present capacity limits of the geostationary belt.

The present coordinatable system provides for constituent systems to cover a specific range of longitudes, rather than global coverage. This allows service to be specifically targeted, and also allows incremental growth tailored to chosen market areas. Coverage is continuous with no handover among satellites required.

It should be understood that specific numerical values are introduced as examples and not as final design values. Potential orbits of a multiplicity of satellites are defined moving "slots". Each slot is capable of hosting at least one satellite. Some slots may be vacant or might contain one or more satellites of various service classes.

Figure 1:
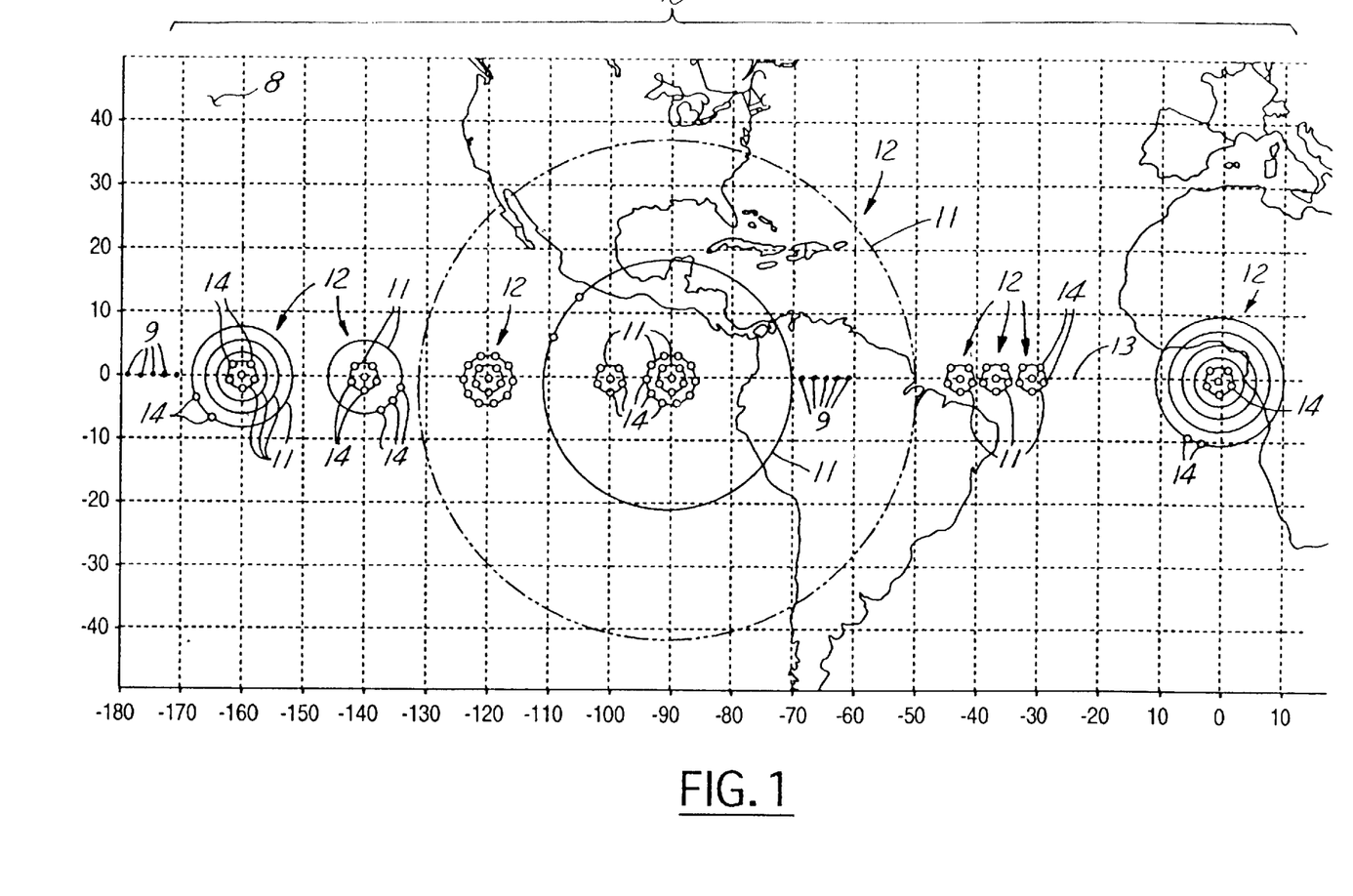
FIG. 1 is a graphical representation of an equirectangular projection map showing some possible multiple Inclined Elliptic Geosynchronous Orbit (IEGO) ground track rings associated with multiple satellite orbits populated by a plurality of satellites.

Referring now to FIG. 1, a graphic representation of a possible set of multiple satellite ground tracks 11 rings in multiple Inclined Elliptic Geosynchronous Orbits (IEGO) is shown. Ground tracks 11 are illustrated as rings and are each potentially populated by multiple geosynchronous satellites.

An equirectangular-projection map 8 shows a major portion of the Earth, with the equator being represented by latitude line zero. The angular distance between adjacent lines of latitude between adjacent meridians (at the equator) is ten degrees (10°). Possible geostationary satellite locations or slots 9 are positioned at the equator in a GSO belt 13.

Inscribed upon map 8 is the coordinatable system of the present invention, generally indicated by reference numeral 10, which includes a plurality of sets or clusters 12 of ground tracks 11 each accommodating coordinated sets of satellites or moving slots 14. Each set includes at least one satellite. All satellites operate in geosynchronous orbits about the Earth.

Figure 2:
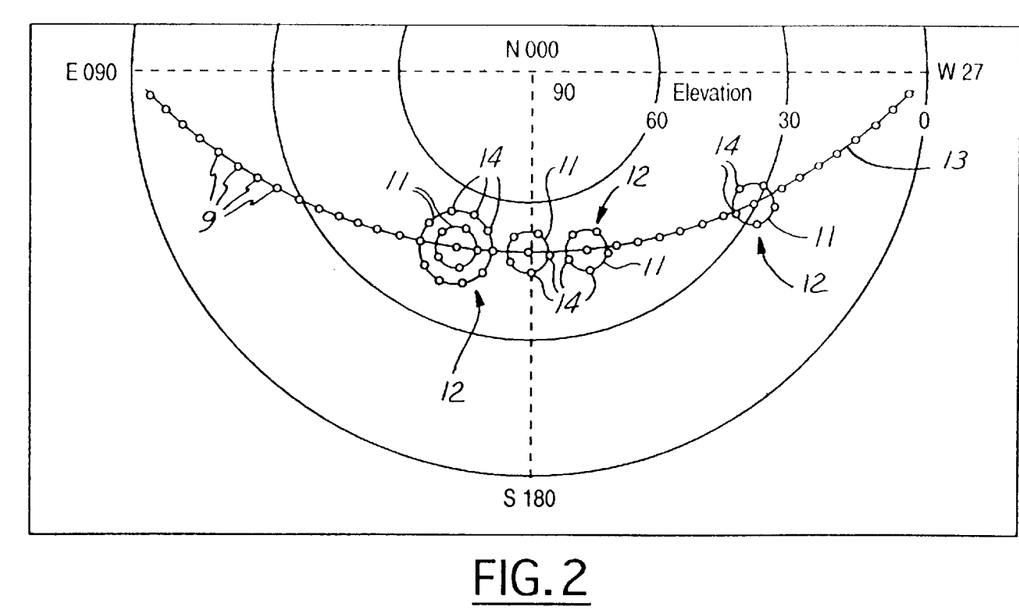
FIG. 2 is a graphic representation of some IEGO rings and GSO slots as viewed from Earth, in polar coordinates.

Referring now to FIG. 2, a view of GSO belt 13 with some IEGO rings with nominal spacing of two degrees (2°) from the perspective of the Earth's center at forty degrees (40°) North latitude is shown. The user elevation angle for the small IEGO rings is similar to that for a GSO at the same longitude, but exhibits a daily variation of radius approximating the inclination. These elevation angles are predictable and tightly bounded, unlike those of LEO or MEO orbits.

Figure 3:
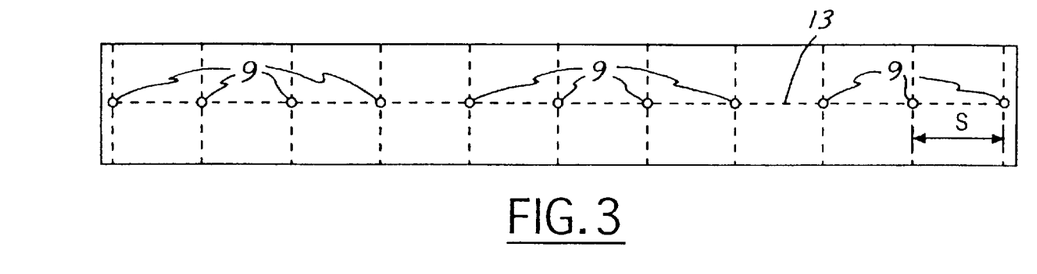
FIG. 3 is a graphical representation of part of the equatorial region showing some possible GSO subsatellite (ground track) points, equally spaced.

Referring now to FIG. 3, the grid represents lines of latitude and longitude on map 8 that are equally spaced S degrees apart. The central horizontal line represents the equator and corresponds to GSO belt 13. GSO belt 13 is a governmentally regulated spacing of satellites. GSO belt 13 is regulated so that each satellite has a minimum spacing S of two degrees (2°), for example. Thus, only 180 potential GSO slots 9 are located about the earth at GSO belt. At this time, most all the slots are in use or are licensed. The several possible GSO satellite points form an essentially fixed-point ground track. Each GSO slot is potentially populated with multiple geostationary satellites to achieve full utilization of available spectrum.

Referring now to FIGS. 4 through 7, extension of the IEGO concept to multiple, multiple-ring, and multiply-occupied clusters of nested IEGO ground tracks can dramatically increase the theoretical total global system capacity.

By replacing two GSO slots 9 with a ring containing more than two moving slots 14, the number of satellites in GSO orbit may be significantly increased. The large circular rings represent IEGO satellite ground tracks 11. Instantaneous subsatellite points of IEGO constituent moving slots 14 and GSO satellite slots 9 are indicated as small circles or dots.

Figure 4:
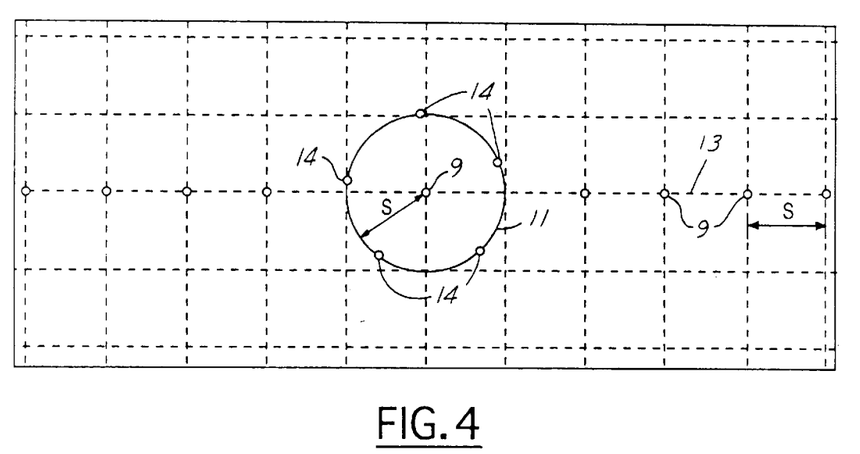
FIG. 4 is a graphical representation of a single IEGO ground track ring of minimum size, and some possible GSOs ground track points.

FIG. 4 is a graphic representation of a ground track 11 of a possible single IEGO orbit, encircling a GSO slot and containing multiple moving slots 14 with each such slot potentially populated with multiple geosynchronous (IEGO) satellites. The radius of the single ring configuration equirectangularly is at least S from the central GSO slot 9. In the current coordinated system S is two degrees, for example. By replacing two GSO slots 9, the number of satellites is increased by three for a total of five. The number of slots may be varied depending on the desired intraring spacing as described below.

Figure 5:
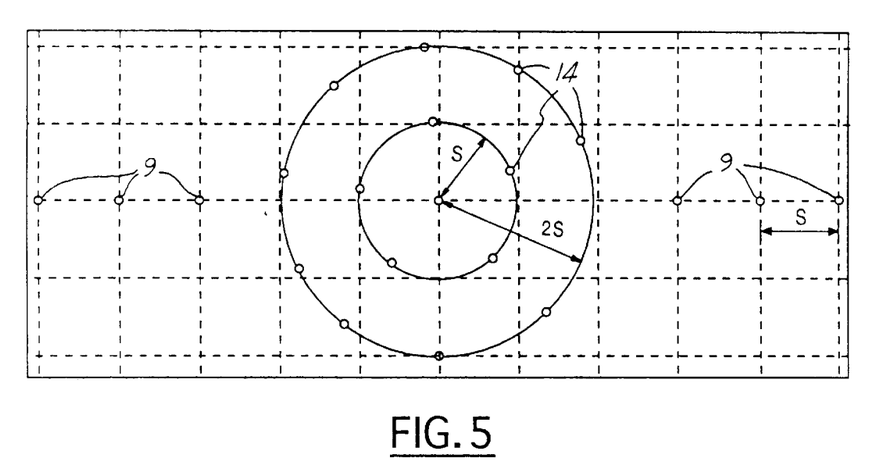
FIG. 5 is a graphical representation of a possible concentric nested pair of IEGO rings and GSO locations.

FIG. 5 illustrates the addition of a second nested IEGO ring (11'), equirectangularly having a radius 2S. The second ring 11' is also located concentrically about the first IEGO ring 11. The second ring also could be the only ring around three GSO slots 9.

Figure 6:
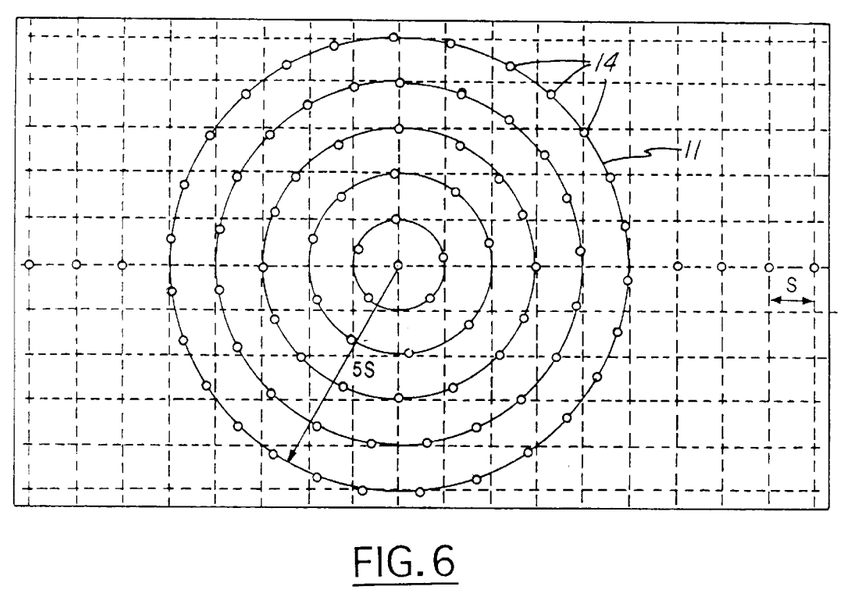
FIG. 6 is a graphical representation of a possible multiply nested cluster of IEGO rings and GSO locations.

FIG. 6 illustrates a further extension of the invention to an IEGO cluster having five concentric rings. The outermost ring thus has a radius of 5S.

For large rings having a radius of greater than 5S, perigee elevation angles for stations at even moderate latitudes may become too low for continuous communication. If the large rings are used, satellite handoff may be employed. The satellites in the large rings may also be used continuously for low latitudes.

Figure 7:
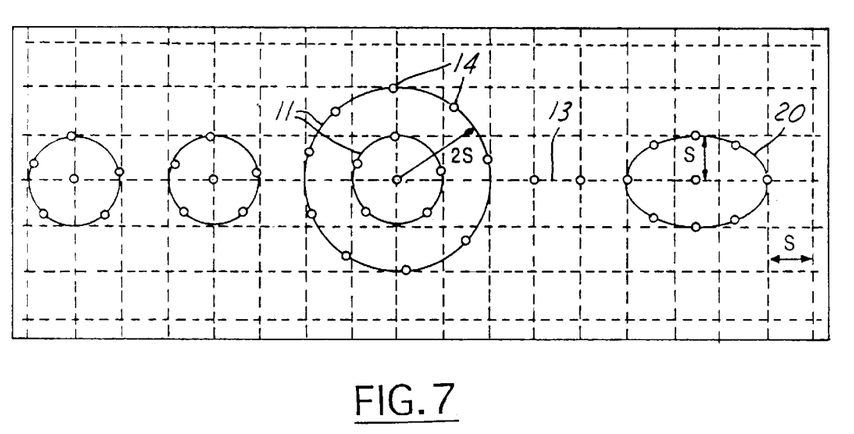
FIG. 7 is a graphical representation of a mixture of several possible sizes of IEGO rings distributed along the equator among some possible GSO locations.

FIG. 7 depicts a mixture of various-sized IEGO rings, along with GSOs, distributed along the Equator to effect an increase in total global geosynchronous capacity. Such increases using localized IEGO clusters can be implemented over a period of time in an evolutionary fashion.

An alternative configuration involves a cluster 20 having ground tracks 11 with greater equatorial width than inclination. The equatorial width of cluster 20 is 3S wide but the inclination extends only 2S. This mode grants some flexibility to skip over existing GSO slots.

Angular spacing separation between slots is an important criterion and an inherent measure of quality in evaluating capacity for any system of satellite positions. The required minimum angular spacing between any two active satellites differs according to the type of service, due to associated antenna sizes. For example, the GSO Ku-band spacing is generally two or three degrees (2°–3°) for Fixed Satellite Service (FSS) and nine degrees (9°) for Broadcast Satellite Service (BSS). The structure of the present invention may have to be configured differently, for example, for use in more than one frequency band, to accommodate such diverse business applications.

The separation angle between two satellites is computed and expressed as viewed from the center of the earth, as opposed to the angle as seen from any point on the Earth's surface (and in particular from within a given service area) in sight of the two satellites.

Intratrack spacing is the angular separation of a plurality of slots moving around a pair of IEGO rings with equal time separation. Minimum IEGO intratrack angular spacing occurs at apogee (northmost, with 270 degree argument of perigee). The capacity of a given track is a function of inclination and eccentricity.

Intertrack spacing between pairs of IEGO rings occurs at specific relative time offsets (true anomalies). This effect is qualitatively apparent in the shape of the larger ground track rings 11 of FIG. 1, but for accuracy must be measured as seen looking outward from the Earth as in FIG. 2. The intertrack spacing from the central GSO slot to all slots on the smallest ring of radius S is greater than 0.99 S, for S up to ten degrees of inclination. If six slots are employed, the compromise to spacing is small. That is, the distance is 1.93 degrees for S=2.

The preferred mode of this invention is the equirectangular method that approaches the ultimate idealized separation and maximum capacity, and fits neatly and incrementally into a pre-existing GSO construct. Shown in FIGS. 1, 2, 4, 5, 6, and 7, the IEGO cluster's rings are of nominal radius N*S, having both inclination and equatorial half-width chosen at exactly N*S. N can also be a multiple of 0.5.

Figure 8:
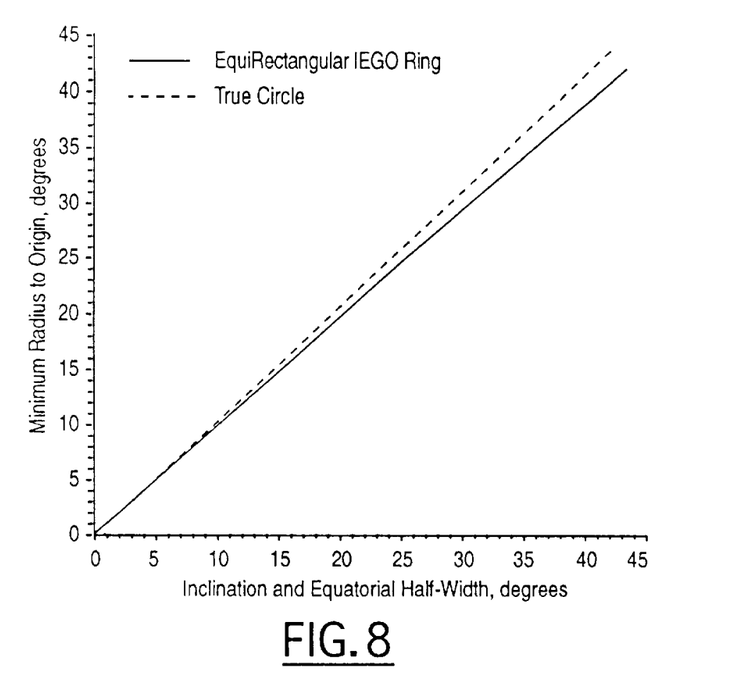
FIG. 8 is a graphical representation of the measure of intertrack spacing pinch effect of equirectangular IEGO rings, presented as the minimum radius to the origin as seen from the Earth.

Referring now to FIG. 8, in the equirectangular mode, the realized minimum intertrack spacing decreases as the radius grows. The magnitude of "pinching" that occurs on each side of apogee for the equirectangular IEGO orbits is shown in FIG. 8. Intertrack spacing between two adjacent IEGO rings decreases slowly as absolute sizes increase. At ten degree inclination, intertrack spacing is greater than 0.98*S, whereas at 40 degrees intertrack spacing falls to about 0.87*S. Since inclinations of up to only ten degrees are preferably used, this is not a great disadvantage.

Figure 9:
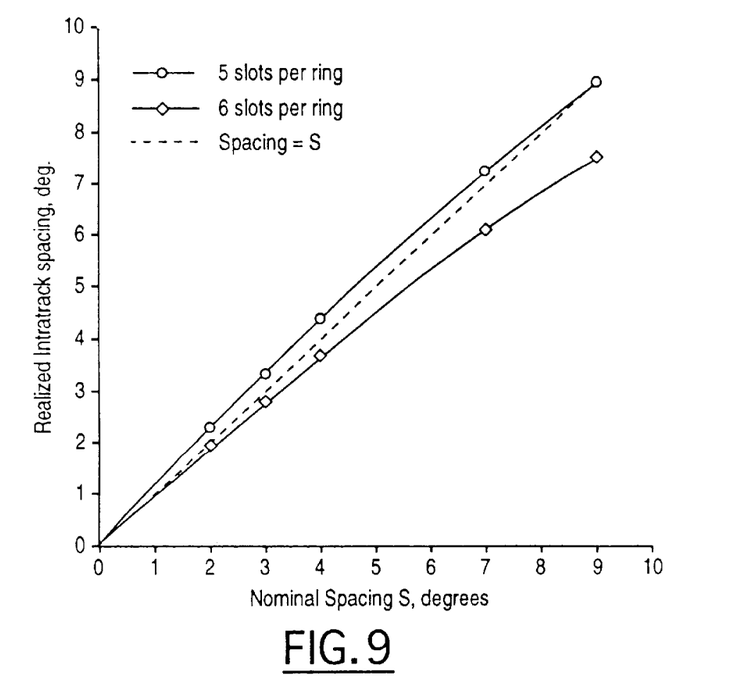
FIG. 9 is a graphical representation of the realized intratrack angular separation spacing for a single, minimum size IEGO ring, for 5 and 6 slot density, as a function of the nominal spacing.

Referring now to FIG. 9, intertrack spacing for a single minimum size IEGO ring is shown. Thus, if five slots per ring are used, the nominal spacing of the slots are just above the intertrack spacing. If six slots per ring are used, the slot spacing is just below the intertrack spacing. Thus, it is possible to employ six slots in the first ring without much compromise in spacing.

Figure 10:
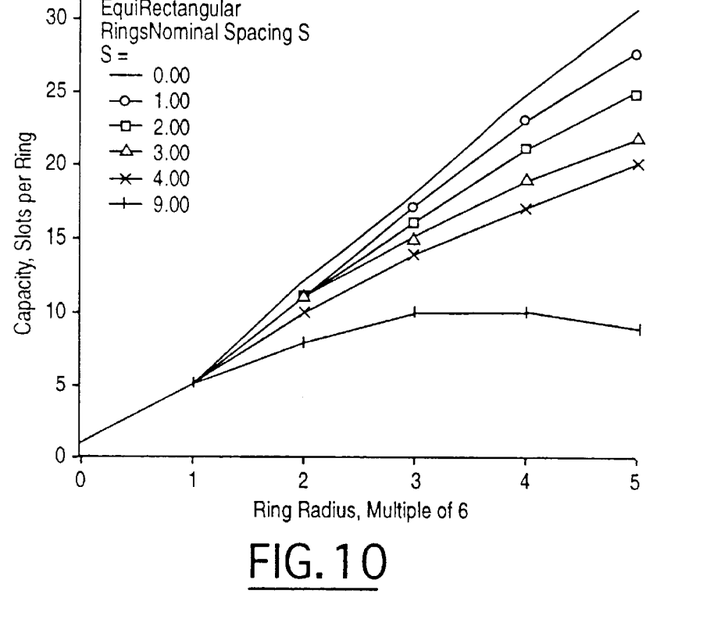
FIG. 10 is a graphical representation of the slot capacity of several successive IEGO rings, for intratrack separation equal to or exceeding the nominal spacing parameter, as a function of the ring radius.

Referring now to FIG. 10, the slot capacity of the second ring of radius 2S in FIG. 5 varies as a function of S while maintaining the minimum intratrack separation spacing of S. Similarly, each additional ring in FIG. 6 replaces two GSO slots with the much larger number of slots per ring as indicated in FIG. 10. For example, for a ring radius of S=3 and a slot spacing of two degrees, 16 rings may be employed. Similarly, 21 rings and 27 rings correspond to a radius of 4S and 5S respectively.

As the number of rings is extended to the maximum realizable, the theoretical capacity grows quite large. In the preferred embodiment of the invention, the invention limits the inclination of the outermost ring to an upper value, of about ten degrees. For inclinations above ten degrees, systems such as the coordinatable system of the parent application may be employed. For example, five rings provides a theoretical maximum of 1270 global slots for S=2 degrees.

Figure 11:
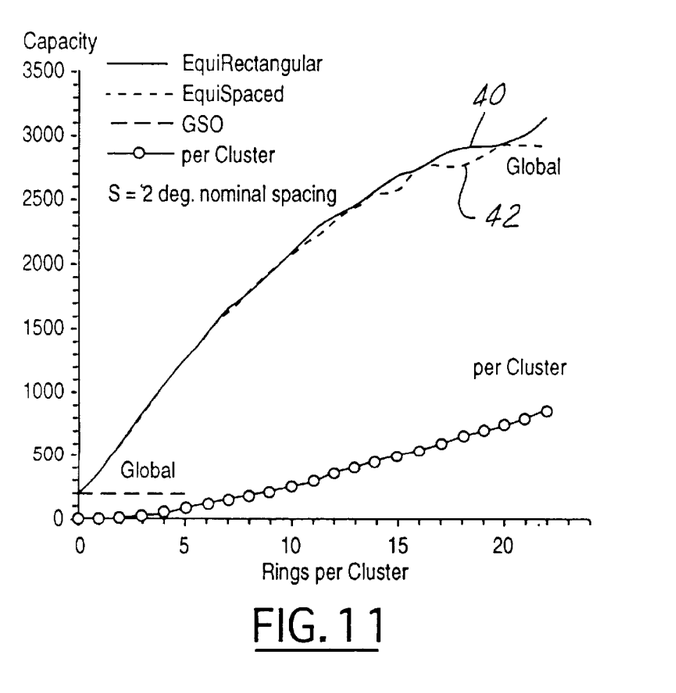
FIG. 11 is a graphical representation of the theoretical global capacity for GSOs and fully extended IEGOs, and capacity per IEGO cluster, for a range of ring counts, for 2 degree nominal spacing.

FIG. 11 demonstrates that for the case S=2 degrees, the cluster capacity and the theoretical potential global capacity growth 40 is over 3000 slots as the number of equirectangular IEGO rings is increased. FIG. 11 also illustrates the capacity of an alternate, equispaced mode 42.

In an equispaced mode, the eccentricity, and optionally the inclination, are adjusted upward as rings grow outward in a manner to maintain intertrack separation spacing equal to S. These "equispaced" modes have slightly lower ultimate capacity than the equirectangular mode. The equispaced modes are less readily deployed as GSO replacements since the equator crossings are not co-extensive with pairs of GSO slots.

Figure 12:
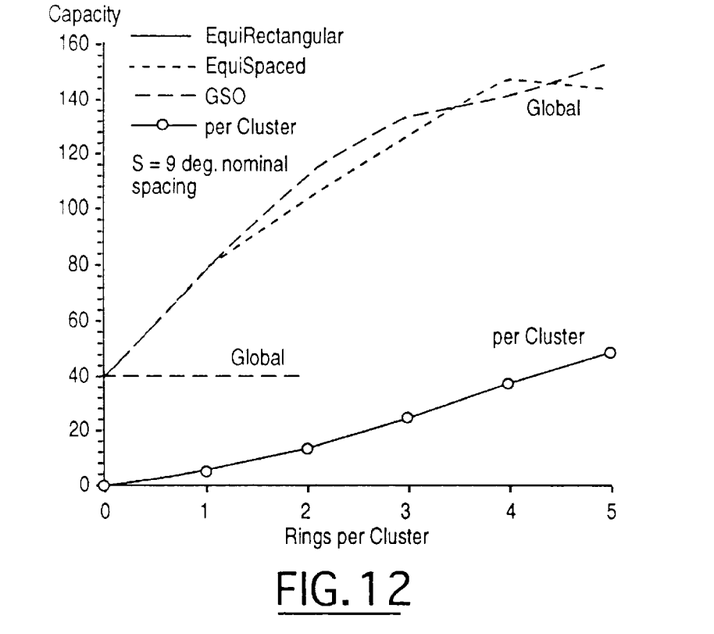
FIG. 12 is a graphical representation of the theoretical global capacity for GSOs and fully extended IEGOS, and capacity per IEGO cluster, for a range of ring counts, for 9 degree nominal spacing.

Referring now to FIG. 12, the theoretical capacity for the case S=9 degrees is shown in a similar manner to that of FIG. 11. The chart illustrates a maximum capacity of 140 slots if rings were employed at a spacing of nine degrees.

Various design choices would be evident to those skilled in the art. One alternative design is that only the inclination may be adjusted upward. This is practical only with significantly derated separation spacing due to more rapid growth of noncircularity leading to self-crossing.

A number of alternative but equivalent parameter sets (alternate coordinate frameworks and transformations) may also be used to describe the system. The present set is based on the geographically fixed, repeating ground track rings.

The coordinatable IEGO system is built up from a hierarchy of building blocks, which include ground tracks 11, orbits of satellites 14, satellite-populated ground tracks, nested clusters or sets 12 of ground tracks, and longitudinally spaced sets 10 of ground tracks. All of these are defined by a number of parameters, which include period or semi-major axis, inclination, eccentricity, longitude of symmetry and longitude of ascending node, argument of perigee, and true anomaly (or time since perigee). Parameter choices can be made to create a family of orbits in each ground track, as well as various ground tracks. Parameter choices are limited by constraints at a given level and in some cases by constraints or choices at higher levels.

Inherent in this invention is the underlying characteristic that the periods of all constituent orbits are geosynchronous. Satellites operating in the inclined eccentric geosynchronous orbits of the present invention have the same period of rotation, as does the Earth, that is, one sidereal day. The period is 23.93447 hours, or about 23 hours and 56 minutes, identical to that for geostationary satellites, so that the ground track repeats daily (with occasional fine adjustments by ground control, which is also necessary for GSOs) within a confined region of longitudes.

Because it reflects the localized apparent orbital motion of the satellites relative to the rotating Earth, the lowest level of the building block hierarchy is the ground track. Geosynchronous satellites traverse repeating ground tracks whose shape is a function of inclination, eccentricity, and argument of perigee. The position of the ground track's longitude of symmetry is therefore a specific design choice.

Preferred ground track shapes embody even symmetry about the vertical axis, created by choosing an argument of perigee of 270 degrees favoring the Northern Hemisphere with dwell time of more than 50 percent. The best mode, using rings inclined up to ten degrees, employs rather small eccentricities where this effect is very modest.

Figure 13:
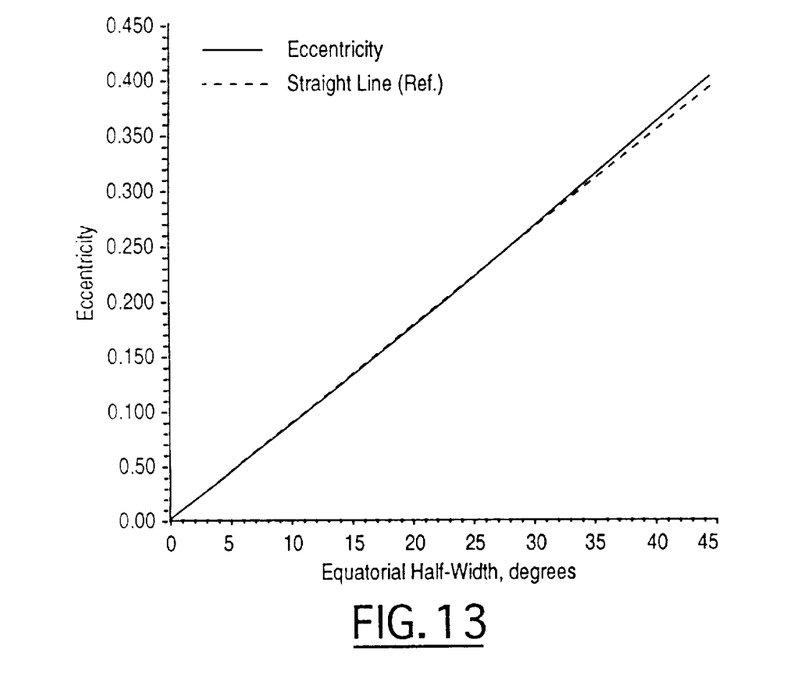
FIG. 13 is a graphical representation of the relationship between eccentricity and Equatorial half-width for an IEGO ground track.

Referring now to FIG. 13, the chosen longitudinal width between equator crossings is effected precisely by setting the eccentricity using the laws of orbital motion, in the relationship represented. This preferred implementation of eccentricity choice avoids self-crossing of the ground track, and provides the capacity desired while maintaining the required separation angles.

Multiple satellites increase the system capacity within each ground track. It is important to note that each ground track represents a substantially unlimited number of possible satellite orbits, differentiated in time. Each orbit defines an ellipse on a plane that is separately inclined with respect to the equatorial plane of the Earth. The differing orientation of each orbit plane is expressed by the longitude of the ascending node (LAN) at epoch.

At the next hierarchical level, the orbital parameters of each individual satellite tracing the specified ground tracks require specification. The time since perigee, or true anomaly (the angle about the Earth's center, in the orbit ellipse) is a design choice, as is the corresponding positioning of the desired longitude of symmetry or the LAN. The phasing of the satellites within the track is designated by the time since perigee at time zero.

Multiple sets of ground tracks, each with multiple satellites, may be nested successively around one another as in FIGS. 1, 2, 5, 6 and 7. The spacing between ground tracks is the result of the ground track's shape parameters. It should be understood by those skilled in the art of which the present invention is a part that other values of eccentricity and spacing and intertrack phase synchronization may be chosen without departing from the scope and spirit of the present invention.

Additional coordinatable capacity and design flexibility is realized by adding multiple clusters of multiple ground tracks with multiple satellites, spaced in longitude as depicted in FIGS. 1, 2, and 7 to provide worldwide coverage. Intersatellite crosslinks may be incorporated within constituent subsystems to provide global communications linkages.

The sets of longitudinally spaced ground tracks need not be identical; FIGS. 1, 2, and 7 provide counter-examples wherein nested group sizes differ relative to others. Many other combinations of parameters are possible within the context of this disclosure.

In this disclosure, all parameters are subject to adjustment to produce an overall coordinatable system design, which maximizes the total number of (moving) slots subject to multiple criteria at each building block decision point.

While the invention has been described in detail, those familiar with the art to which this invention relates will recognize various alternative designs and embodiments for practicing the invention as defined by the following claims.

What is claimed is:

1. A system of inclined eccentric geosynchronous satellite orbits coordinatable with a geostationary belt of satellite positions having a plurality of geostationary slots, said system comprising:
    a plurality of satellite positions representing the maximum number of satellites that may be included in the coordinatable system of inclined eccentric geosynchronous satellite orbits to achieve optimum satellite coverage continuously within a specified service area;
    each satellite position being located in one of a plurality of satellite orbits forming one of a plurality of families of satellite orbits;
    each of the plurality of satellite orbits within any one of the plurality of families of satellite orbits defining an orbital plane having a unique inclination with respect to the equatorial plane of the Earth and with respect to the orbital plane of any other one of the plurality of satellite orbits within the same family of satellite orbits, the satellite orbits intersecting the geostationary belt;
    loci of subsatellite points repeatedly traced upon the surface of the Earth by a straight line extending from the center of the Earth to an orbiting satellite position generating an imaginary ground track on the surface of the Earth;
    the ground track traced by orbiting satellite positions within any one of the plurality of families of satellite orbits defining an area therewithin that differs from the area defined within the ground track traced by orbiting satellite positions within any other family of satellite orbits;
    the ground tracks being mutually and generally symmetrically nested about a first longitude of symmetry to form a first set of ground tracks; and
    the satellite positions within each of the plurality of families of satellite orbits being coordinated with each other and being further coordinated with the satellite positions to achieve a specified angular separation between said ground tracks of said satellites occupying the plurality of satellite positions.

2. A system as recited in claim 1, wherein the satellite orbits displace a pair of existing geostationary slots.

3. A system as recited in claim 1, wherein the ground tracks are substantially circular.

4. A system as recited in claim 1, wherein said angular separation is two degrees.

5. A system as recited in claim 1, wherein said ground tracks have a center corresponding to one of said geostationary slots.

6. A system as recited in claim 1, wherein the satellites in each of the plurality of families of satellite orbits are coordinated so that they are equally spaced in time in said ground track.

7. A system as recited in claim 1, further including a plurality of additional satellite positions to generate at least a second set of ground tracks disposed at at least a second longitude of symmetry.

8. A system of inclined eccentric geosynchronous satellite orbits coordinatable with a geostationary belt of satellite positions having a plurality of geostationary slots, said system comprising:
    a plurality of satellite positions representing the maximum number of satellites that may be included in the coordinatable system of inclined eccentric geosynchronous satellite orbits to achieve optimum satellite coverage continuously within a specified service area;
    each satellite position being located in one of a plurality of satellite orbits forming one of a plurality of families of satellite orbits;
    each of the plurality of satellite orbits within any one of the plurality of families of satellite orbits defining an orbital plane having a unique inclination with respect to the equatorial plane of the Earth and with respect to the orbital plane of any other one of the plurality of satellite orbits within the same family of satellite orbits, the satellite orbits intersecting the geostationary belts;
    the plurality of satellite orbits within any one of the plurality of families of satellite orbits having identical apogees;
    loci of subsatellite points repeatedly traced upon the surface of the Earth by a straight line extending from the center of the Earth to an orbiting satellite position generating an imaginary ground track on the surface of the Earth;
    the ground track traced by orbiting satellite positions within any one of the plurality of families of satellite orbits defining an area therewithin that differs from the area defined within the ground track traced by orbiting satellite positions within any other family of satellite orbits;
    the ground tracks being mutually and generally symmetrically nested about one of said geostationary slots to form a first set of ground tracks;
    the ground tracks having a predetermined spacing; and
    the satellite positions within each of the plurality of families of satellite orbits being coordinated with each other and being further coordinated with the satellite positions to achieve a minimum specified angular between said ground tracks of said satellites occupying the plurality of satellite positions.

9. A system as recited in claim 8, wherein said predetermined spacing corresponds to a spacing of the geostationary slots.

10. A system as recited in claim 8, wherein said predetermined spacing is two degrees.

11. A system as recited in claim 8, wherein said ground tracks have a center corresponding to the geostationary slots.

12. A system as recited in claim 8, wherein each of the plurality of satellite orbits is configured to position the maximum latitude of the ground track tracked by orbiting satellite positions within each family of satellite orbits at a specified longitude.

13. A system as recited in claim 8, wherein the satellites in each of the plurality of families of satellite orbits are coordinated so that they are equally spaced in time.

14. A system as recited in claim 8, further including a plurality of additional satellite positions to generate at least a second set of ground tracks disposed at at least a second longitude of symmetry.

15. A method of providing a system of inclined eccentric geosynchronous satellite orbits coordinatable with a geostationary belt of satellite positions having a plurality of geostationary slots, the method comprising:

specifying at least one geographic service within which satellite coverage is to be provided;

defining a plurality of families of satellite orbits, each satellite orbit defining the path of a satellite position, each satellite orbit in each of the pluralities of families of satellite orbits defining an orbital plane having a unique inclination with respect to the equatorial plane of the Earth, each of the orbits intersecting a geostationary belt, loci of subsatellite points repeatedly traced upon the surface of the Earth by a straight line extending from the center of the Earth to an orbiting satellite position generating an imaginary ground track on the surface of the Earth, the ground track traced by orbiting satellite positions within any one of the plurality of families of satellite orbits defining an area therewithin that differs from the area defined within the ground track traced by orbiting satellite positions within any other family of satellite orbits;

configuring each satellite orbit in each of the plurality of families of satellite orbits so that the ground tracks are mutually and generally symmetrically nested about a first longitude of symmetry to form a first set of ground tracks;

determining a maximum number of satellites, and thus of satellite orbits, that may be included in each of the plurality of families of satellite orbits and determining the shape and geographic position of each ground track to achieve a minimum specified angular separation between satellite positions using the same frequencies and to achieve optimum satellite coverage continuously during the specified period in the at least one service area specified; and coordinating the position of satellites in satellite orbits in accordance with the determined maximum number of satellite positions and the minimum specified angular separation therebetween.

16. A method as recited in claim 15, wherein the step of defining a plurality of families of satellite orbits, each orbit defining the path of a satellite position, further includes defining a center of the ground tracks as one of said plurality of geostationary slots.

17. A method as recited in claim 15, wherein the step of defining a plurality of families of satellite orbits, each orbit defining the path of a satellite position, further includes defining a spacing between ground tracks corresponding to a spacing of the geostationary slots.

18. A method as recited in claim 15, following the step of determining a maximum number of satellites, further including the step of configuring each of the plurality of satellite orbits to position the maximum latitude of the ground track traced by orbiting satellite positions within each family of satellite orbits at a specified longitude.

19. A method as recited in claim 15, wherein the step of coordinating the placement of satellites in satellite orbits further includes phasing the satellites in each of the families of satellite orbits so that they are equally spaced in time.

20. A method as recited in claim 15, following the step of configuring each to the plurality of satellite orbits to position the maximum latitude of the ground track traced by orbiting satellite positions within each family of satellite orbits at a specified longitude, further including the step of including additional satellite positions to generate at least a second set of ground tracks disposed at at least a second longitude of symmetry.

* * * * *